US010972380B2

(12) United States Patent
Iyer et al.

(10) Patent No.: US 10,972,380 B2
(45) Date of Patent: Apr. 6, 2021

(54) METHOD FOR CONFIGURING A CONNECTION USING REDUNDANT SERVICE NODES

(71) Applicant: Versa Networks, Inc., Santa Clara, CA (US)

(72) Inventors: Sridhar Iyer, Sunnyvale, CA (US); Apurva Mehta, Cupertino, CA (US); Dave Traugott, Alpharetta, GA (US); Suraj Chandrasekaran, San Jose, CA (US)

(73) Assignee: Versa Networks, Inc., San Jose, CA (US)

( * ) Notice: Subject to any disclaimer, the term of this patent is extended or adjusted under 35 U.S.C. 154(b) by 5 days.

(21) Appl. No.: 15/091,388

(22) Filed: Apr. 5, 2016

(65) Prior Publication Data

US 2017/0289018 A1    Oct. 5, 2017

(51) Int. Cl.
*H04L 12/707* (2013.01)
*H04L 12/24* (2006.01)

(52) U.S. Cl.
CPC .......... *H04L 45/22* (2013.01); *H04L 41/0823* (2013.01)

(58) Field of Classification Search
None
See application file for complete search history.

(56) References Cited

U.S. PATENT DOCUMENTS

| | | | | |
|---|---|---|---|---|
| 8,761,005 B2* | 6/2014 | Subramanian | ........ | H04L 45/245 370/225 |
| 2006/0291378 A1* | 12/2006 | Brotherston | ........ | H04L 12/2854 370/221 |
| 2008/0037418 A1* | 2/2008 | Cole | ........ | H04L 12/66 370/220 |
| 2008/0291928 A1* | 11/2008 | Tadimeti | ........ | H04L 45/22 370/401 |
| 2008/0304519 A1* | 12/2008 | Koenen | ........ | H04L 12/10 370/477 |
| 2008/0313703 A1* | 12/2008 | Flaks | ........ | H04L 63/101 726/2 |
| 2009/0003206 A1* | 1/2009 | Bitar | ........ | H04L 47/125 370/230.1 |
| 2009/0086651 A1* | 4/2009 | Luft | ........ | H04L 41/5067 370/253 |
| 2009/0141622 A1* | 6/2009 | Bitar | ........ | H04L 45/245 370/225 |
| 2010/0329147 A1* | 12/2010 | Nam | ........ | H04L 45/18 370/254 |
| 2011/0038267 A1* | 2/2011 | Smith | ........ | H04L 43/0811 370/248 |
| 2011/0085570 A1* | 4/2011 | Kotha | ........ | H04L 45/7453 370/419 |
| 2011/0243032 A1* | 10/2011 | Jenne | ........ | H04L 12/12 370/254 |

(Continued)

*Primary Examiner* — Christopher T Wyllie
(74) *Attorney, Agent, or Firm* — Loza & Loza, LLP

(57) ABSTRACT

A method involves setting a link aggregation control protocol (LACP) link state for all links in a first service node to STANDBY to put at least one multiplexer in the first service node in a WAITING state to disable frame collection at the redundant service node and setting the LACP link state for all links in a second service node to SELECTED to put at least one multiplexer in the second service node in a COLLECTING/DISTRIBUTING state to enable frame collection at the primary service node.

15 Claims, 11 Drawing Sheets

(56) References Cited

U.S. PATENT DOCUMENTS

| | | | |
|---|---|---|---|
| 2011/0258346 A1* | 10/2011 | Said | H04L 45/245 709/249 |
| 2012/0155872 A1* | 6/2012 | Kakadia | H04J 3/1658 398/58 |
| 2012/0236859 A1* | 9/2012 | Subramanian | H04L 45/245 370/392 |
| 2013/0121141 A1* | 5/2013 | Hao | H04L 45/245 370/228 |
| 2013/0148512 A1* | 6/2013 | Sarwar | H04L 41/042 370/252 |
| 2013/0229912 A1* | 9/2013 | Yu | H04L 41/0663 370/228 |
| 2013/0246470 A1* | 9/2013 | Price | G06F 21/6209 707/783 |
| 2013/0301427 A1* | 11/2013 | Tsai | H04L 45/245 370/252 |
| 2013/0308471 A1* | 11/2013 | Krzanowski | H04L 43/0811 370/252 |
| 2013/0322427 A1* | 12/2013 | Stiekes | H04L 49/45 370/352 |
| 2014/0141777 A1* | 5/2014 | Guo | H04W 8/005 455/434 |
| 2014/0161132 A1* | 6/2014 | Tatsumi | H04L 49/557 370/401 |
| 2014/0169176 A1* | 6/2014 | Brock | H04L 12/12 370/241 |
| 2014/0198636 A1* | 7/2014 | Thayalan | H04L 49/25 370/228 |
| 2014/0215027 A1* | 7/2014 | Janardhanan | H04L 49/30 709/220 |
| 2014/0369186 A1* | 12/2014 | Ernstrom | H04L 45/586 370/228 |
| 2014/0372576 A1* | 12/2014 | Mohandas | H04L 49/354 709/220 |
| 2015/0172112 A1 | 6/2015 | Itkin et al. | |
| 2015/0188760 A1* | 7/2015 | Anumala | H04L 41/083 370/254 |
| 2015/0195125 A1* | 7/2015 | Wu | H04L 45/28 370/225 |
| 2015/0263970 A1 | 9/2015 | Macchiano et al. | |
| 2015/0271104 A1 | 9/2015 | Chikkamath et al. | |
| 2015/0288559 A1* | 10/2015 | Yasuda | H04L 41/0654 370/217 |
| 2015/0288620 A1* | 10/2015 | Yasuda | H04L 49/552 370/401 |
| 2015/0304209 A1 | 10/2015 | Choudhury et al. | |
| 2016/0094459 A1* | 3/2016 | Yasuda | H04L 12/467 370/401 |
| 2016/0127270 A1* | 5/2016 | Yasuda | H04L 45/245 370/401 |
| 2016/0149816 A1* | 5/2016 | Wu | H04L 45/28 370/235 |
| 2016/0156560 A1* | 6/2016 | Yasuda | H04L 41/0654 370/315 |
| 2016/0173216 A1* | 6/2016 | Yang | H04J 3/0667 370/350 |
| 2017/0063672 A1* | 3/2017 | Chhabra | H04L 45/28 |
| 2017/0289018 A1* | 10/2017 | Iyer | H04L 41/0823 |

* cited by examiner

METHOD FOR CONFIGURING A CONNECTION USING REDUNDANT SERVICE NODES

BACKGROUND

Link aggregation allows multiple Ethernet interfaces on a single network node to be grouped together to form a single logical link with higher aggregate bandwidth than the individual links associated with each Ethernet interface. The logical link is referred to as a link aggregation group (LAG). Media access control (MAC) clients can be configured to interface with the LAG as a single link, which can increase bandwidth, redundancy, and resource availability.

SUMMARY

In accordance with an embodiment of the invention, a method for configuring a connection using redundant service nodes is disclosed. The method involves setting a link aggregation control protocol (LACP) link state for all links in a first service node to STANDBY to put at least one multiplexer in the first service node in a WAITING state to disable frame collection at the redundant service node, setting the LACP link state for all links in a second service node to SELECTED to put at least one multiplexer in the second service node in a COLLECTING/DISTRIBUTING state to enable frame collection at the primary service node, and, upon receipt of notification from the second service node, setting the LACP link state for all links in the first service node to SELECTED to put the at least one multiplexer in the first service node in the COLLECTING/ DISTRIBUTING state, and setting the LACP link state for all links in the second service node to STANDBY to put the at least one multiplexer in the second service node in the WAITING state.

In a second embodiment, setting the LACP link state for all links in a service node to STANDBY is triggered by putting the service node in a BACKUP mode and setting the LACP link state for all links in a service node to SELECTED is triggered by putting the service node in an ACTIVE mode.

In another embodiment, the LACP link state for each link is set by setting a selected variable for each link.

In another embodiment, the selected variable for a link is set using a link aggregation control protocol with protocol data units transmitted on one second intervals.

In another embodiment, the selected variable for all links in a service node is set concurrently.

In another embodiment, the notification is sent out-of-band.

In another embodiment, the notification is sent in response to at least one of the second service node becoming unavailable, tracking interfaces becoming unavailable, and a manual user interaction.

In another embodiment, link types of the first service node and link types of the second service node are different link types.

In another embodiment, the WAITING state, the COLLECTING state, and the DISTRIBUTING state are states as defined in the IEEE 802.1AX standard.

In another embodiment, a method for managing a Link Aggregation Group, hereinafter a LAG, is disclosed. The method involves attaching all ports connected to links in a LAG to aggregators, setting a LACP link state for all links in the LAG to SELECTED and collecting frames from the ports via the aggregators in order to enable traffic over the LAG, and setting the LACP link state for all links in the LAG to STANDBY and ignoring frames from the ports at the aggregators in order to disable traffic over the LAG.

In another embodiment, setting a LACP link state for all links in the LAG to SELECTED is triggered by putting a service node to which the LAG is communicatively coupled in ACTIVE mode and wherein setting the LACP link state for all links in the LAG to STANDBY is triggered by putting the service node to which the LAG is communicatively coupled in BACKUP mode.

In another embodiment, setting the LACP link state for all links in a LAG is facilitated by setting a selected variable in an aggregation controller controlling the aggregators attached to the links.

In another embodiment, the LACP link state of all links is set concurrently.

In another embodiment, the LACP link state of all links is set using a link aggregation control protocol with protocol data units transmitted on one second intervals.

In another embodiment, the LACP link state of all the links with an LACP link state set to STANDBY is set to SELECTED when a notification is received.

In another embodiment, the LAG is logically joined with a second LAG and the LACP link state of all of the links in one of the LAGs is set to SELECTED and the LACP link state of all of the links in the other LAG is set to STANDBY.

In another embodiment, a method for routing traffic in a link aggregation group as defined in IEEE 802.1AX is disclosed. In the embodiment, the method involves attaching all ports connected to links in a first link aggregation group (LAG) to aggregators and attaching all ports connected to links in a second LAG to aggregators and turning collecting and distributing on in the first LAG and turning collecting and distributing off in the second LAG, wherein collecting and distributing is turned on or off by setting LACP link states and wherein LACP link states are set concurrently for all links in a LAG.

In another embodiment, collecting and distributing is turned on by a first link aggregation control protocol command that sets a Partner_Oper_Port_State.Synchronization variable to "TRUE" and wherein collecting and distributing is turned off by a second link aggregation control protocol command that sets the Partner_Oper_Port_State.Synchronization variable to "FALSE".

In another embodiment, the LACP link states are set using a link aggregation control protocol with protocol data units transmitted on one second intervals.

In another embodiment, collecting and distributing is turned on for a LAG in which collecting and distributing is turned off when a notification is received.

Other aspects and advantages of embodiments of the present invention will become apparent from the following detailed description taken in conjunction with the accompanying drawings.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
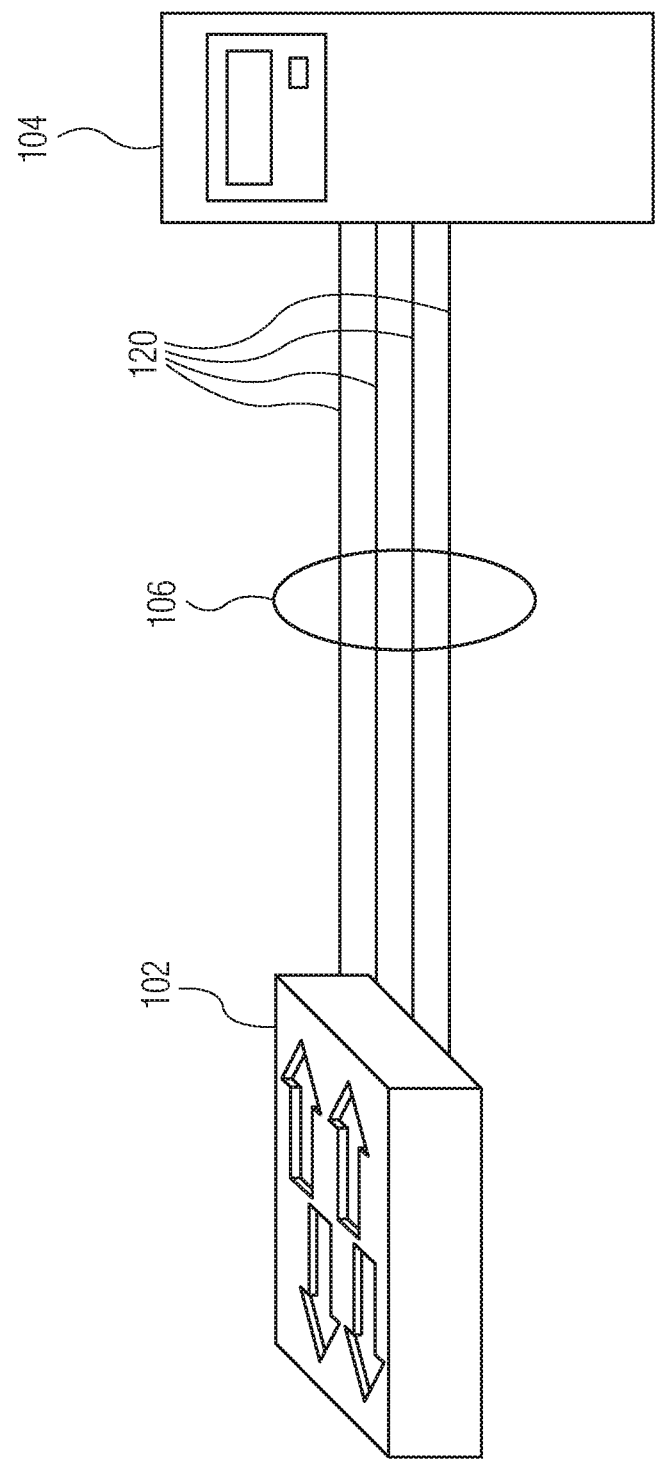
FIG. 1 illustrates two nodes linked by a link aggregation group (LAG).

FIG. 1 illustrates two nodes linked by a link aggregation group (LAG). As illustrated, a switch 102 has a plurality of links 120 connecting to ports in an end node 104. The links are aggregated, as indicated by the ring. Aggregated links form an aggregated Ethernet or LAG 106 and the resultant connection between the switch and the end node is a LAG link.

Figure 2:
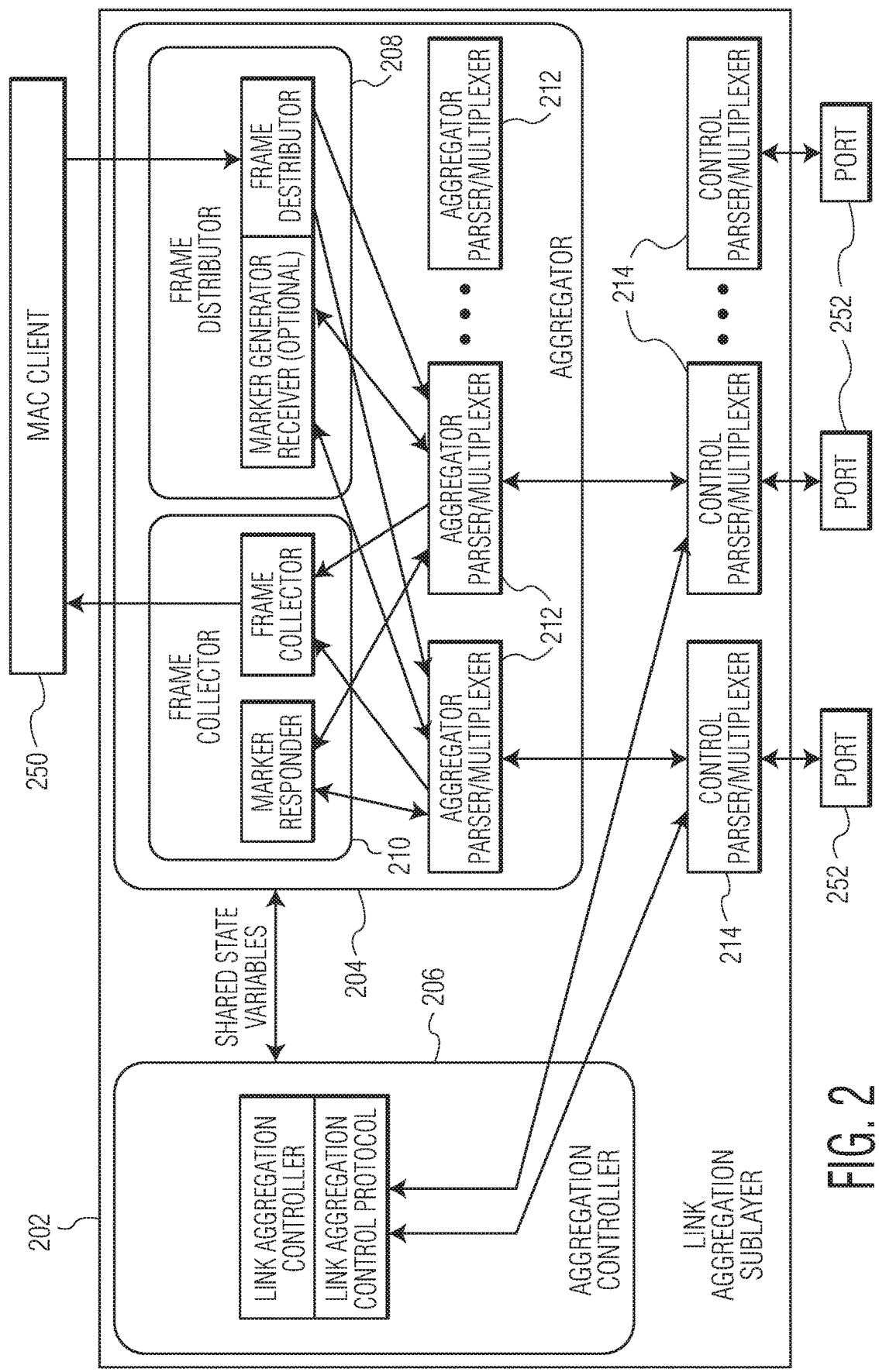
FIG. 2 is a functional block diagram of a link aggregation sublayer.

In order to aggregate the links on a node, a link aggregation sublayer can be implemented in the network module within the node (e.g., within a data link layer of the ISO-OSI network model). A link aggregation sublayer and supporting protocol (e.g., LACP) are described in the IEEE 802.1AX standard entitled "IEEE Standard for Local and metropolitan area networks—Link Aggregation" updated Nov. 3, 2008. FIG. 2 is a functional block diagram of a link aggregation sublayer 202 similar to the link aggregation sublayer described with reference to FIG. 5-3 of the IEEE 802.1AX standard. The link aggregation sublayer includes an aggregation controller 206, control parser/multiplexers 214, and an aggregator 204, the aggregator including a frame distributor 208, a frame collector 210, and aggregator parser/multiplexers 212. The frame distributer implements a frame distribution algorithm responsible for selecting appropriate ports 252 on which frames from a MAC client 250 should be transmitted. The frame collector passes frames received from a port to the MAC client. On transmission, the aggregator parser/multiplexers pass frame transmission requests from the frame distributor to an appropriate port and, on receive, the aggregator parser/multiplexers distinguish among different frame types (e.g., Marker Requests, Marker Responses, MAC Client protocol data units, etc.) and pass each frame to an appropriate entity. The aggregation controller configures and controls link aggregation using a link aggregation control protocol (LACP). LACP for Ethernet is defined in IEEE 802.1AX. On transmission, the control parser/multiplexers pass frame transmission requests from the aggregator and aggregation controller to an appropriate port and, on receive, the control parser/multiplexers distinguish link aggregation control protocol data units (LACPDUs) from other frames and pass the LACPDUs to the appropriate sublayer entity as defined in IEEE 802.1AX and all other frames to the aggregator.

When configured, the MAC client 250 communicates with the ports 252 connected to links through the aggregator 204 controlled by the aggregation controller 206. The aggregator binds to a port and distributes frame transmissions from the MAC client to the bound port and collects frames from the bound port and passes the frames to the MAC client transparently. A node may utilize multiple aggregators to serve multiple MAC clients, but each aggregator serves a single MAC client and a single port at a time.

Figure 3:
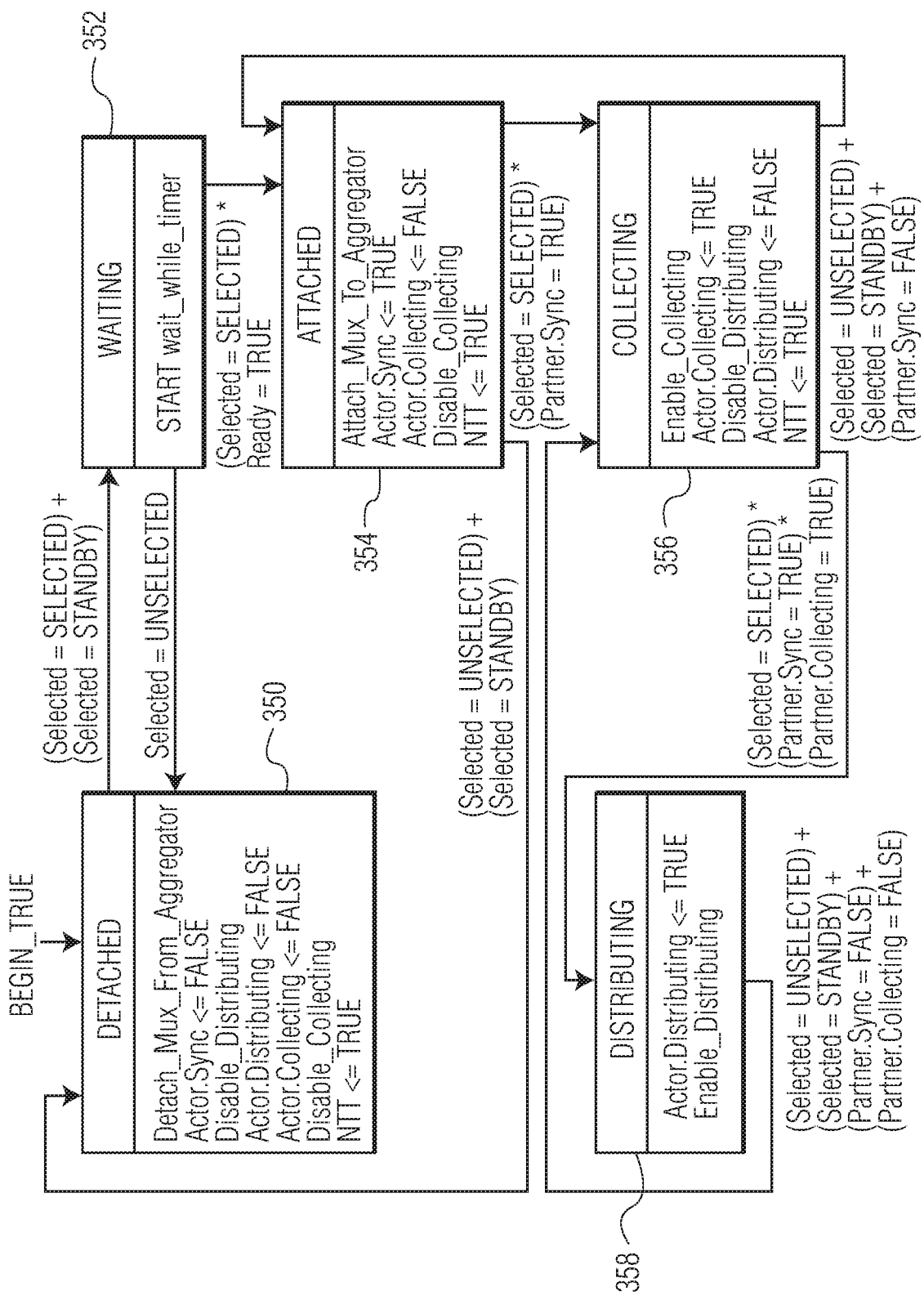
FIG. 3 is a diagram of states of the LACP mux state machine as defined by 802.1AX.

In order to bind a port to an aggregator and in order to transmit and receive frames via the port, the aggregator parser/multiplexer 212 for a port can transition through states defined by IEEE 802.1AX as directed by a mux state machine. FIG. 3 is a diagram of the states of the mux state machine as defined in 802.1AX. When a node initializes a port, an aggregator parser/multiplexer binds to the port and begins in the DETACHED state 350. When the mux state machine detects that a selected variable for the port is set to SELECTED or set to STANDBY, the mux state machine enters the WAITING state 352. Once an aggregator becomes free, the aggregator parser/multiplexer for the port can attach to the free aggregator and the mux state machine enters the ATTACHED state 354. In the ATTACHED state, the port is attached to an aggregator, but cannot receive or transmit frames. When the mux state machine determines that a Partner_Oper_Port_State.Synchronization value (Partner. Sync value), as defined in IEEE 802.1AX, for a port is TRUE, the mux state machine enters the COLLECTING state 356. When the mux state machine is in the COLLECT- ING state, the multiplexer distinguishes LACPDUs from other frames and passes the LACPDUs to the appropriate sublayer entity and all other frames to the aggregator. If the Partner.Sync value becomes FALSE, then the mux state machine re-enters the ATTACHED state. The mux state machine stays in the COLLECTING state until it determines that a partner (e.g., a peer node distributing the frames received while in the COLLECTING state) has transitioned to the COLLECTING state, upon which the mux state machine enters the DISTRIBUTING state 358. When the port finishes distributing frames, the mux state machine re-enters the COLLECTING state. If the port determines that a link to which the port is attached becomes unavailable (e.g., disconnected from a port on the other end of the link or failure of the link), then the mux state machine can re-enter the ATTACHED state. Thus, traffic is sent via a port in the DISTRIBUTING state, but not via a port in the ATTACHED state. The links within a LAG can be in various states depending on the availability of ports and the flow of traffic.

Figure 4:
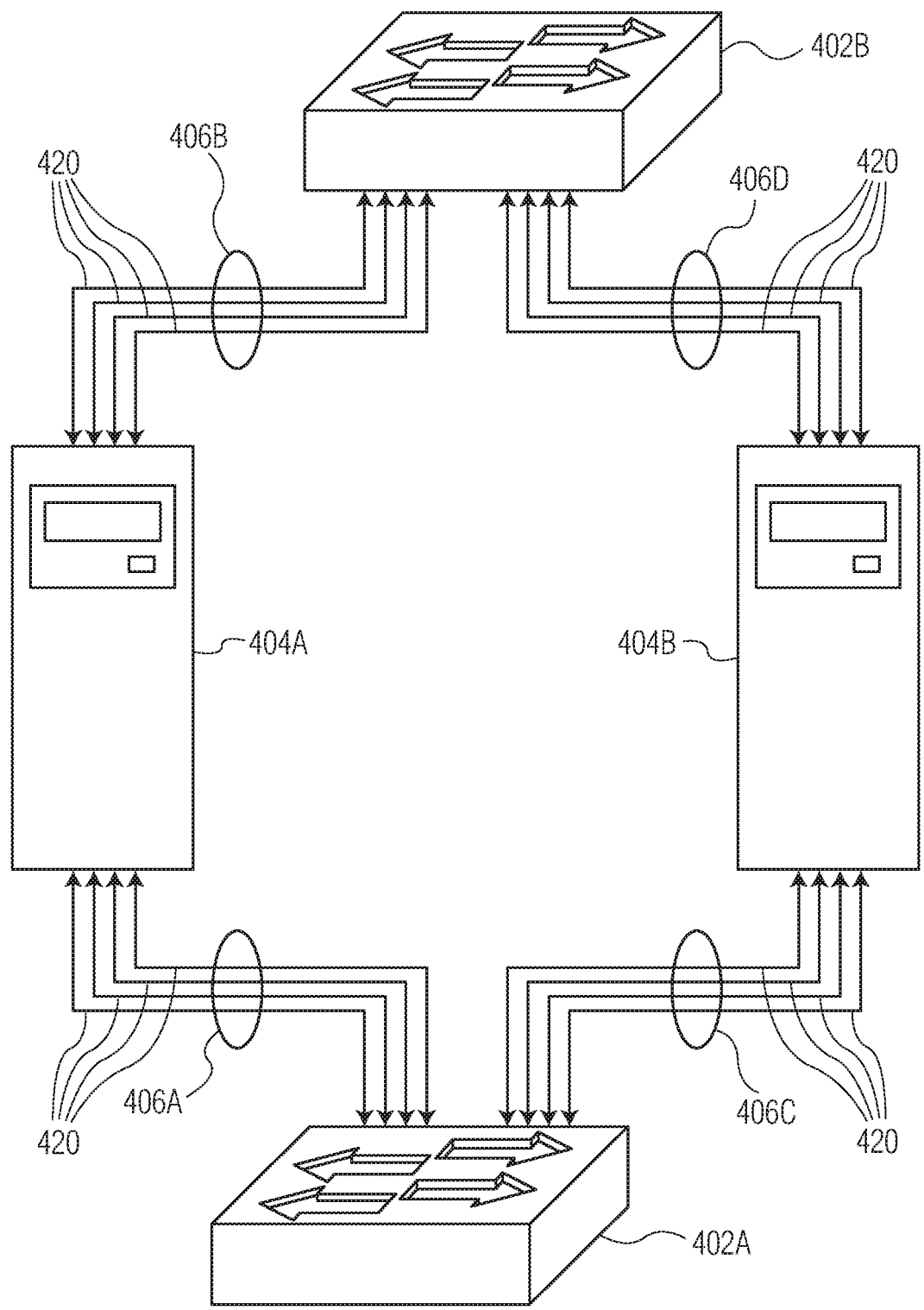
FIG. 4 is an illustration of a connection using redundant service nodes between two switches.

In addition to aggregating links, LAGs can also be used to create redundancy. If several links within a LAG go down, the other links in the LAG that remain up can be used to keep traffic flowing over the LAG. FIG. 4 is an illustration of a connection using redundant service nodes between two switches. The connection is formed by a plurality of LAGs 406A-406D and each LAG link is formed by several links 420. A first LAG 406A connects a first switch 402A to a first service node 404A and a second LAG 406B connects the first service node to a second switch 402B. A third LAG 406C connects the first switch to a second service node 404B and a fourth LAG 406D connects the second service node to the second switch. The service nodes can be edge switches configured to manage each LAG and to connect a switch on a local area network (LAN) to a wide area network (WAN). In order to recognize the LAGs, the LAGs are configured on the first switch and on the second switch. Typically, if the LAG is not configured on the switches, then the switches would treat each link in the LAG as independent from every other link. Thus, each switch is configured in order to implement the LAG.

Figure 5A:
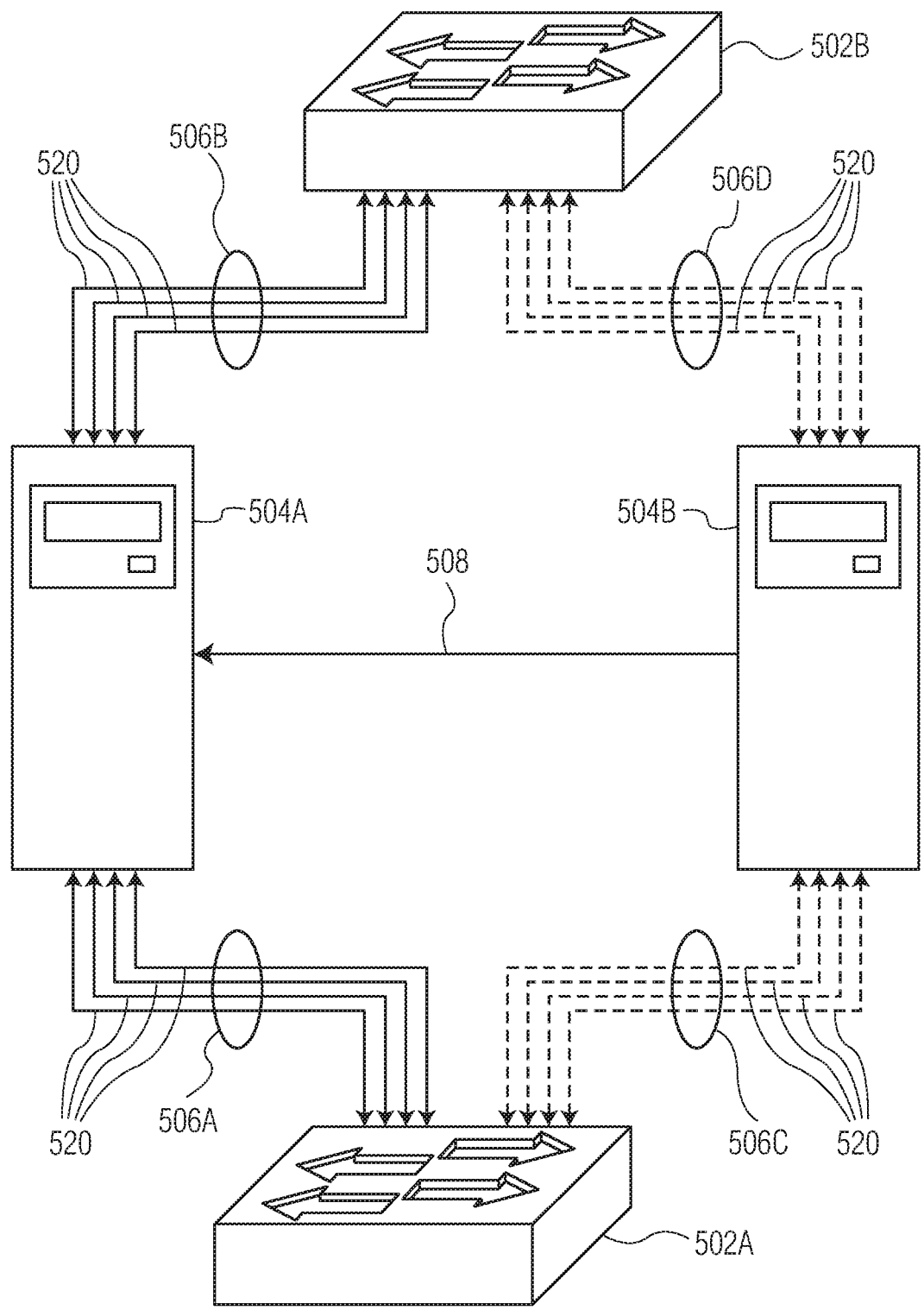
FIGS. 5A and 5B illustrate a connection using redundant service nodes configured using LAGs.
Figure 5B:
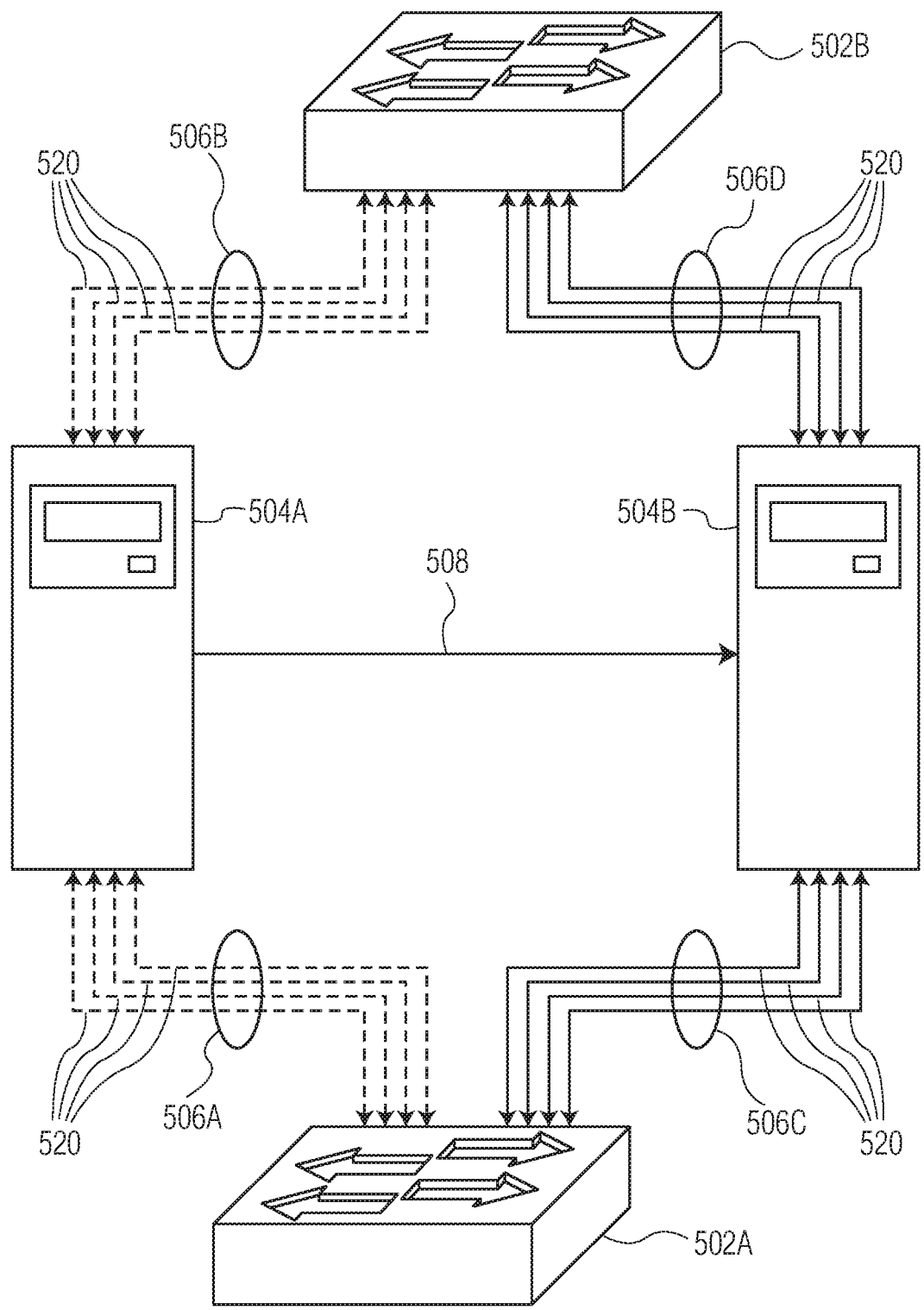

In order to implement redundancy, service nodes are configured to route traffic along a preferred path and along a backup path when the preferred path becomes unavailable. FIGS. 5A and 5B illustrate a connection using redundant service nodes configured using LAGs. The connection is formed by several LAGs 506A-506D formed by links 520 having the same link type (e.g., same speed, same duplex, etc.). FIG. 5A illustrates the preferred path along which traffic is routed by solid arrows and a backup path by dotted arrows. When a first switch 502A transmits data, it can transmit frames along either a first LAG 506A or a second LAG 506C. If data is transmitted along the first LAG 506A, then it is received by a first service node 504A and forwarded along to a second switch 502B via LAG 506B. Alternatively, if data is transmitted along the second LAG 506C, then it is received by a second service node 504B and forwarded along to the first service node 504A via an in-band connection 508 before being forwarded again to the second switch 502B via LAG 506B. In an embodiment, the in-band connection is a high-throughput connection over which network traffic can flow. Thus, all traffic can eventually be routed through the first service node 504A before arriving at the second switch 502B. However, if the preferred path between the first switch 502A and the second switch 502B over LAG 506A is unavailable, then the backup path is used.

FIG. 5B illustrates the backup path along which traffic is routed by solid arrows and the disabled path by dotted arrows. Now, if data is transmitted along the first LAG 506A, then it is received by the first service node 504A and forwarded along to the second service node 504B via the in-band connection 508 before being forwarded along to the second switch 502B via LAG 506D and, if data is transmitted along the second LAG 506C, then the data is received by a second service node 504B and forwarded along to the second switch 502B via LAG 506D. Thus, all traffic is eventually routed through the second service node 504B before arriving at the second switch 502B. While the redundancy implementation is functional, the solution requires an additional hop for some data along the in-band connection. For example, in FIG. 5A, data sent along the second LAG has an additional hop from the second service node to the first service node along the in-band connection. Additionally, the in-band connection between the service nodes is needed to re-route data.

A connection can be configured using redundant service nodes connected via LAGs without introducing additional hops and without an in-band connection between the service nodes. In accordance with an embodiment of the invention, a method for configuring a connection using redundant service nodes is disclosed. The method involves setting a link aggregation control protocol (LACP) link state for all links in a first service node to STANDBY to put at least one multiplexer in the first service node in a WAITING state to disable frame collection at the redundant service node, setting the LACP link state for all links in a second service node to SELECTED to put at least one multiplexer in the second service node in a COLLECTING/DISTRIBUTING state to enable frame collection at the primary service node, and, upon receipt of notification from the second service node, setting the LACP link state for all links in the first service node to SELECTED to put the at least one multiplexer in the first service node in the COLLECTING/DISTRIBUTING state, and setting the LACP link state for all links in the second service node to STANDBY to put the at least one multiplexer in the second service node in the WAITING state. Thus, a connection using redundant service nodes can be formed by a first LAG connecting a first node to a first service node, a second LAG connecting the first service node to a second node, a third LAG connecting the first node to a second service node, and a fourth LAG connecting the second service node to the second node. In an embodiment, setting the LACP link state is triggered by putting the service node in a BACKUP mode or an ACTIVE mode, which causes a selected variable for each link to be concurrently set to STANDBY or SELECTED, respectively, in order to maintain a uniform state across all links in a service node at the same time. By putting the first service node in ACTIVE mode, the selected variable for all links in the first LAG is concurrently set to SELECTED, a mux communicatively coupled to the links is put in the COLLECTING/DISTRIBUTING state, and traffic over the first LAG can be enabled. Thus, collecting and distributing is turned on in the first service node. Additionally, by putting the second service node in BACKUP mode, the selected variable for all links in the second LAG is collectively set to STANDBY, a mux communicatively coupled to the links is put in the WAITING state, and traffic over the second LAG can be disabled. Thus, collecting and distributing is turned off in the second service node. That is, traffic can be directed exclusively over the first service node or the second service node depending on the mode of the service nodes and, thus, the state of the links in the service nodes. Accordingly, additional hops (e.g., data routed to the redundant service node) can be avoided and traffic can be routed over a preferred route without traveling over an in-band connection between service nodes. Additionally, because traffic can be routed over service nodes by setting the modes of the service nodes, configuration of the LAGs at the nodes is not required.

Figure 6:
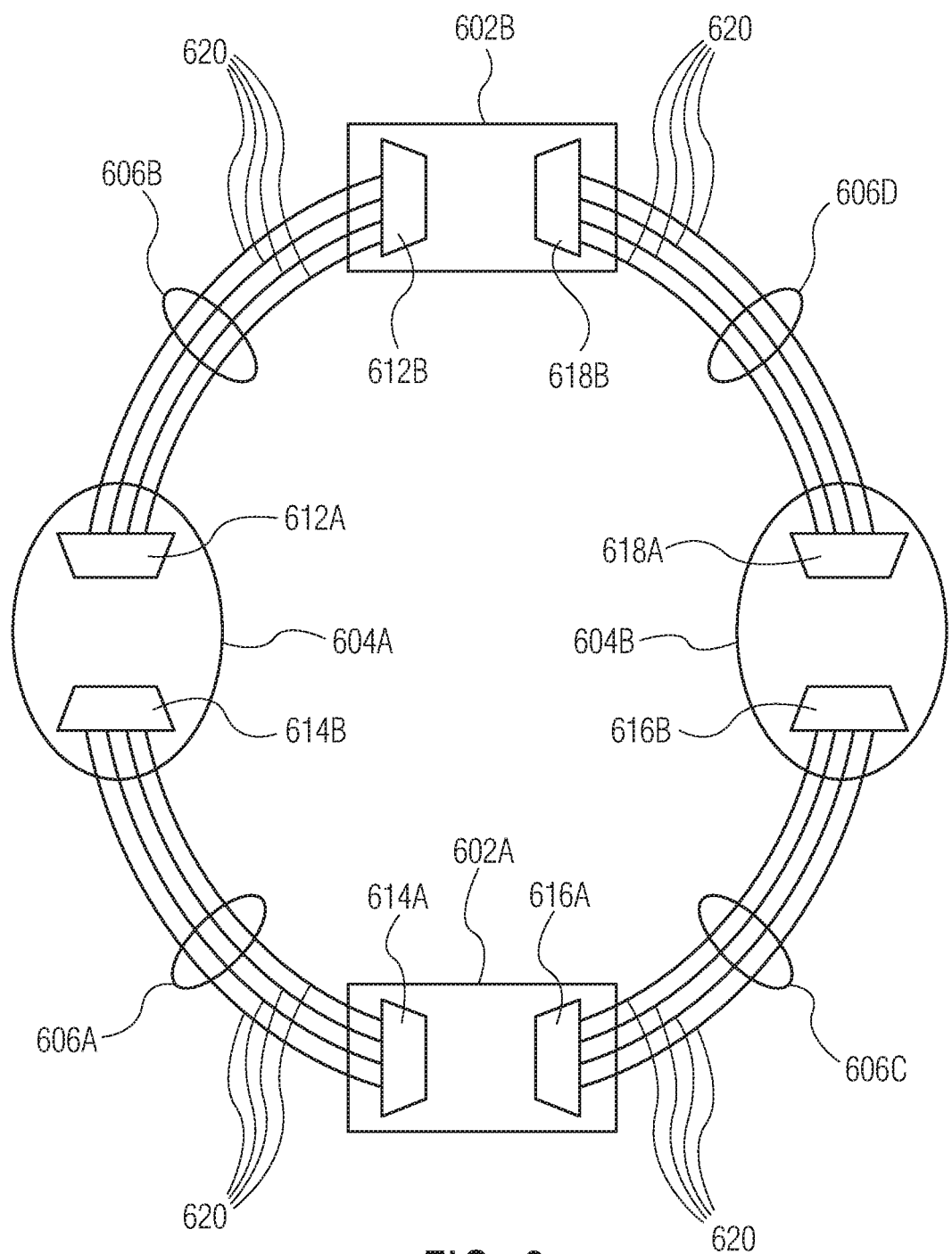
FIG. 6 illustrates a connection using redundant service nodes in accordance with an embodiment of the invention.

In order to implement the above-described technique, LACP link states (e.g., as defined in IEEE 802.1AX, IEEE 802.1aq, and various proprietary solutions) can be set in aggregation controllers on service nodes based on the mode of the service nodes in order to adjust the state of multiplexers within the service nodes. FIG. 6 illustrates a connection using redundant service nodes in accordance with an embodiment of the invention. The connection includes a first switch 602A, a second switch 602B, a first service node 604A, a second service node 604B, a first LAG 606A between the first switch and the first service node, a second LAG 606B between the first service node and the second switch, a third LAG 606C between the first switch and the second service node, and a fourth LAG 606D between the second service node and the second switch. The LAGs are communicatively coupled to multiplexers (e.g., aggregation parser/multiplexers 212 in FIG. 2) in the service nodes and switches. The first LAG is formed by links 620 communicatively coupled to a multiplexer (mux) 614A in the first switch and to a mux 614B in the first service node. The second LAG is formed by links communicatively coupled to a mux 612A in the first service node and to a mux 612B in the second switch. The third LAG is formed by links communicatively coupled to a mux 616A in the first switch and to a mux 616B in the second service node. The fourth LAG is formed by links communicatively coupled to a mux 618A in the second service node and to a mux 618B in the second switch.

Unlike the redundancy implementation described with reference to FIGS. 4-5B, the redundancy implementation described with reference to FIG. 6 can be implemented without configuring the switches to route traffic over one service node or another and without an in-band connection between service nodes, because traffic can be directed over a preferred path or a redundant path by simply setting the mode of a service node, and thus, the LACP link state of links in the service node. Additionally, dissimilar link types can be used along the preferred path and along the redundant path. For example, without configuring a switch, a first LAG can be a half-duplex link and a second LAG can be a full-duplex link.

Figure 7:
FIG. 7 is a table of correlations between a mode of a service node, a LACP link state for links in the service node, and a state of the mux state machine within the service node.

FIG. 7 is a table 700 of correlations between a mode of a service node, a LACP link state for links in the service node, and a state of the mux state machine within the service node. Service node A is a first service node, such as the first service node 604A in FIG. 6, and service node B is a second service node, such as the second service node 604B in FIG. 6. As shown on the left side of the table, when data is traveling over the preferred path through service node A, service node A is in ACTIVE mode, while service node B along the redundant path is in BACKUP mode. The LACP link state for links in service node A can be set to SELECTED and the LACP link state for links in service node B can be set to STANDBY. In an embodiment, when the mode of the service nodes are set, LACP link states can be set accordingly by manually or automatically setting selected variables using LACP commands. In service node A, because the LACP link states are set to SELECTED, the mux state machine for the multiplexers in service node A enters the COLLECTING/DISTRIBUTING state. Additionally, in service node B, because the LACP link states are set to STANDBY, the mux state machine for the multiplexers in service node B enters the WAITING state. Thus, traffic will flow through service node A, but not through service node B.

As shown on the right side of the table, when it is determined that traffic should flow through service node B (e.g., because of user intervention or because service node A becomes unavailable), service node A switches to BACKUP mode and service node B switches to ACTIVE mode. When service node A switches to BACKUP mode, the LACP link state for links in service node A is set to STANDBY and, when service node B switches to ACTIVE mode, the LACP link state for links in service node B is set to SELECTED. In an embodiment, the LACP link states can be set by setting selected variables using a single LACP command. For example, a LACP command setting a Partner_Oper_Port_State.Synchronization variable to "TRUE" in order to set the LACP link state to SELECTED and a LACP command setting the Partner_Oper_Port_State.Synchronization variable to "FALSE" in order to set the LACP link state to STANDBY. By setting the LACP link state, the mux state machine in each service node enters the corresponding state. For example, the mux state machine in service node A will enter the WAITING state and the mux state machine in service node B will enter the COLLECTING/DISTRUBITING state. Thus, upon issuance of the LACP command, traffic will flow through service node B, but not through service node A.

In an embodiment, it is determined that traffic should flow through a redundant service node (e.g., service node B 604B in FIG. 6) when a notification is received from a primary service node. The notification can be sent via an out-of-band channel between the service nodes over which network traffic does not flow (not shown). The notification can be sent in response to the primary service node (e.g., service node A 604A) becoming unavailable. For example, when the primary service node determines that a connection to a target switch (e.g., the second switch in FIG. 6) is down or disabled, the primary service node can send a notification to the redundant service node. The notification can be sent in response to tracking interfaces becoming unavailable. For example, one or more links (but not all) in a LAG (e.g., the first LAG 606A in FIG. 6) can go down (e.g., is unable to connect with a target switch), but the connection between a service node and a target switch can still be maintained. Some links can be configured as "tracking interfaces" and if a tracking interface goes down, then a notification can be sent even if other links remain connected to a target switch. The notification can be sent in response to manual user interaction. For example, a network administrator can manually trigger a primary service node to send a notification in order to route traffic over a redundant service node if a primary service node needs to be taken offline. The notification can be sent when the number of available links on the redundant service node is greater than the number of available links on the primary service node. For example, if a redundant service node has four functioning links (e.g., four links that are available), but a primary service node is experiencing a failure of two links and has only two available links, then the primary service node can send a notification to the redundant service node. The notification can be sent in accordance with a user-defined traffic policy. For example, it may be beneficial to route traffic over a redundant service node at night, while it may be more beneficial to route traffic over a primary service node during the day.

Thus, at a specific time, the primary service node can send a notification to the redundant service node.

Figure 8:
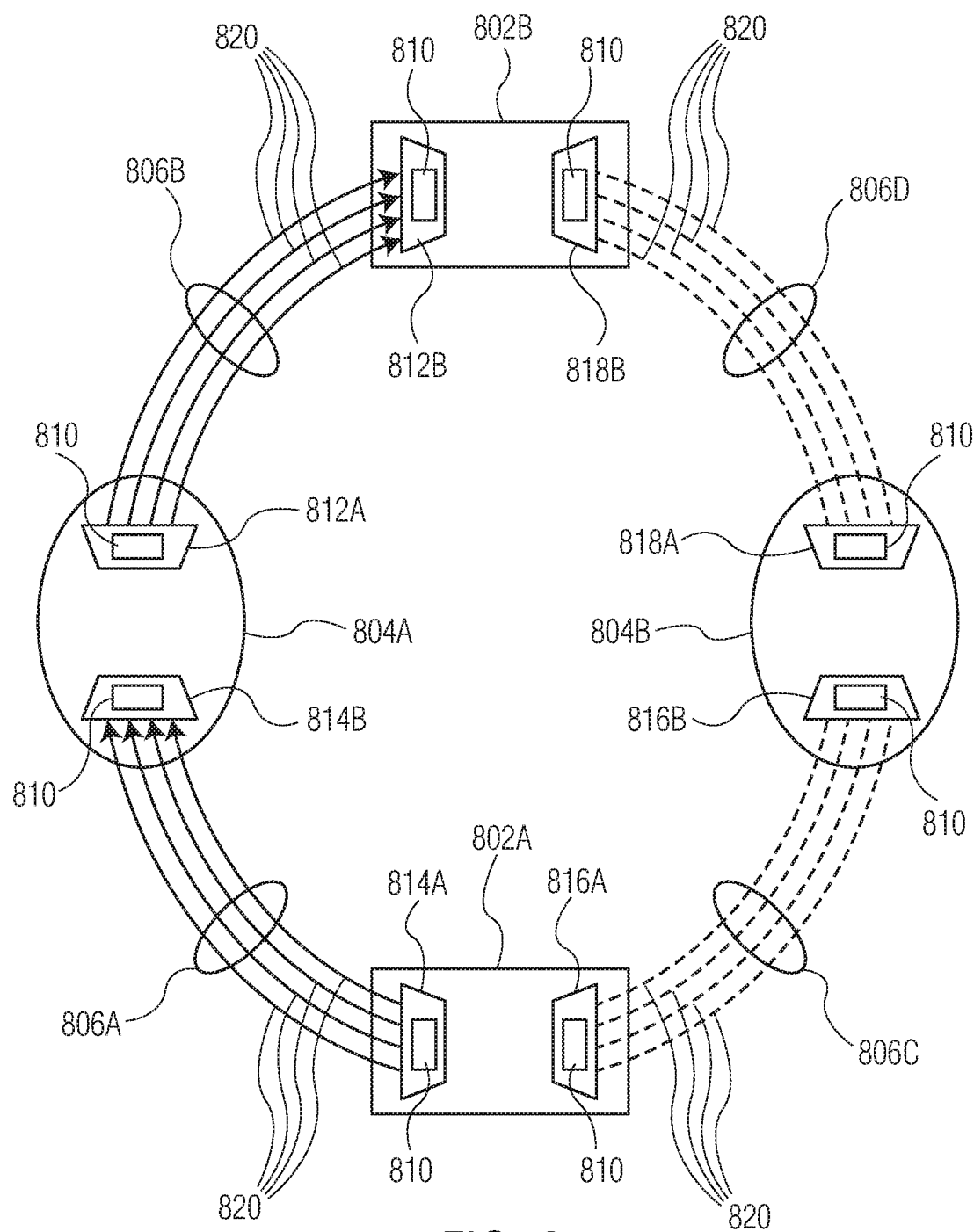
FIG. 8 is a block diagram of the connection of FIG. 6 in which traffic is flowing over the preferred path.

FIG. 8 is a block diagram of the connection of FIG. 6 in which traffic is flowing over the preferred path, as indicated by the links identified with solid lines. LACP link states of links in the first service node 804A are set to SELECTED causing mux state machines 810 in mux 814B and in mux 812A of the first service node to enter the COLLECTING/DISTRIBUTING state. In response, mux state machines 810 in the corresponding mux 814A in the first switch 802A and in the corresponding mux 812B in the second switch 802B also enter the COLLECTING/DISTRIBUTING state depending on the direction of the traffic flow. Accordingly, traffic flows over the links through service node A. Meanwhile, LACP link states of links in the second service node 804B are set to STANDBY causing mux state machines 810 in mux 816B and in mux 818A to enter the WAITING state. In response, mux state machines 810 in the corresponding mux 816A of the first switch 802A and the mux 818B of the second switch 802B enter the ATTACHED state. No traffic is communicated via the LAGs 806C, 806D (as illustrated by the dotted link lines).

In an embodiment, in order to route traffic over a redundant path, as indicated by links identified with dashed lines, service node A is configured to set the LACP link state for all links coupled to the service node to STANDBY in order to cause the mux state machines within service node A to enter the WAITING state and to send a notification to service node B (e.g., automatically in response to the failure of links communicatively coupled to service node A or when manually triggered by a user) when the mode of service node A is set to BACKUP. As a result, the mux state machines of the multiplexers 812B, 814A in the switches 802A, 802B enter the ATTACHED state. Thus, traffic over service node A is disabled because the link over service node A appears to be down or disabled.

Figure 9:
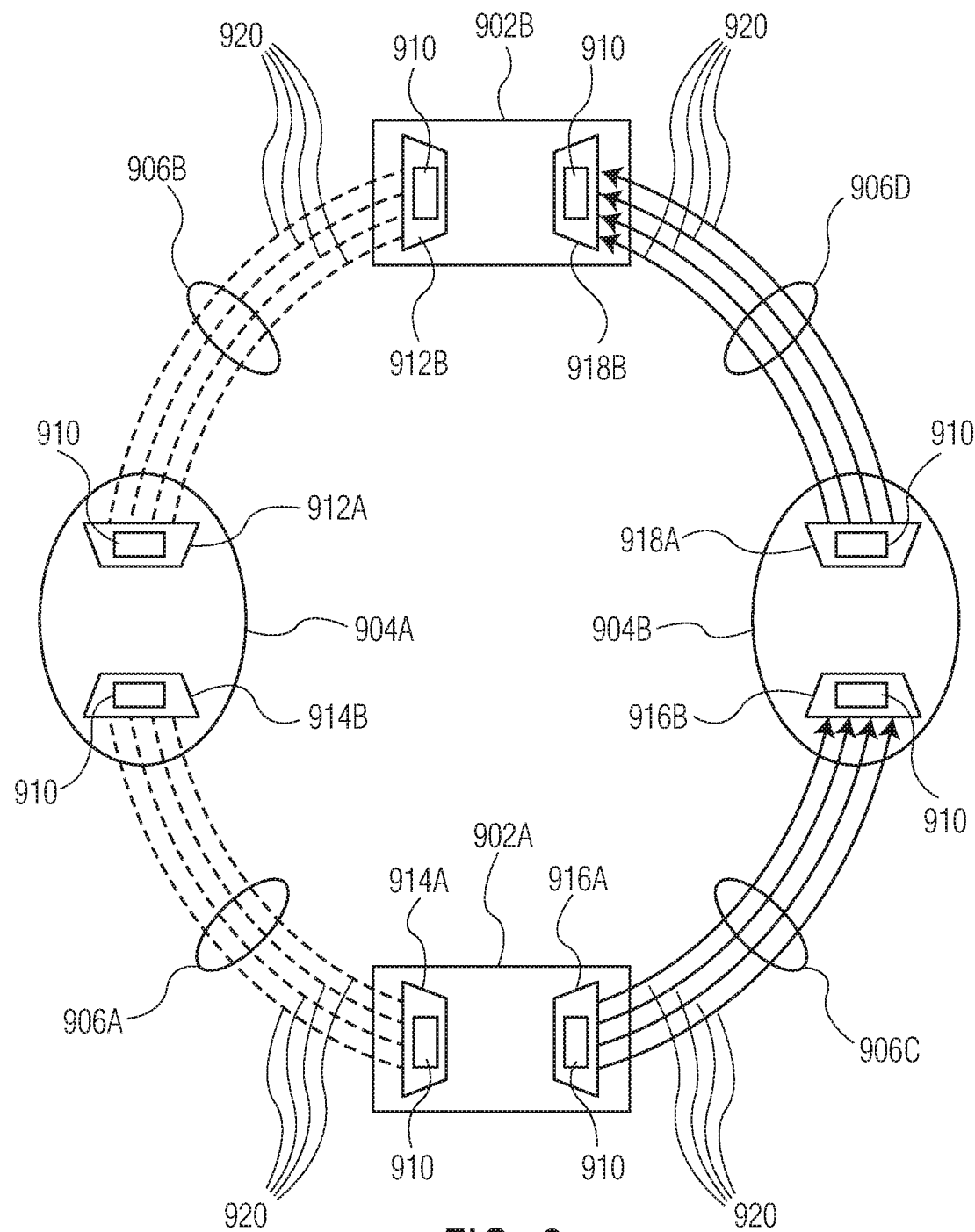
FIG. 9 is a block diagram of the connection of FIG. 8 in which traffic is flowing over the redundant path.

When service node B receives the notification, service node B is put into ACTIVE mode and is configured to set the LACP link state for all links in the service node to SELECTED in order to cause the mux state machines within service node B to enter the COLLECTING/DISTRIBUTING state. FIG. 9 is a block diagram of the redundant network of FIG. 8 in which traffic is flowing over the redundant path, as indicated by the solid links. The mux state machines 910 in mux 918A and in mux 916B in service node B 904B are in the COLLECTING/DISTRIBUTING state and traffic flows over links 920 in LAGs 906C and 906D (as illustrated by the solid lines). As a result, mux state machines 910 of mux 918B of the second switch 902B and mux 916A of the first switch 902A also enter the COLLECTING/DISTRIBUTING state. Meanwhile, the LACP link state of links in service node A is set to STANDBY and the mux state machines in mux 912A and in mux 914B enter the WAITING state. As a result, mux state machines 910 of mux 914A of the first switch and mux 912B of the second switch enter the ATTACHED state. No traffic is communicated via the LAGs 906A, 906B (as illustrated by the dotted link lines). Thus, traffic is routed over the redundant path via LAGs 906C and 906D because the redundant path appears to be the only enabled path.

Figure 10:
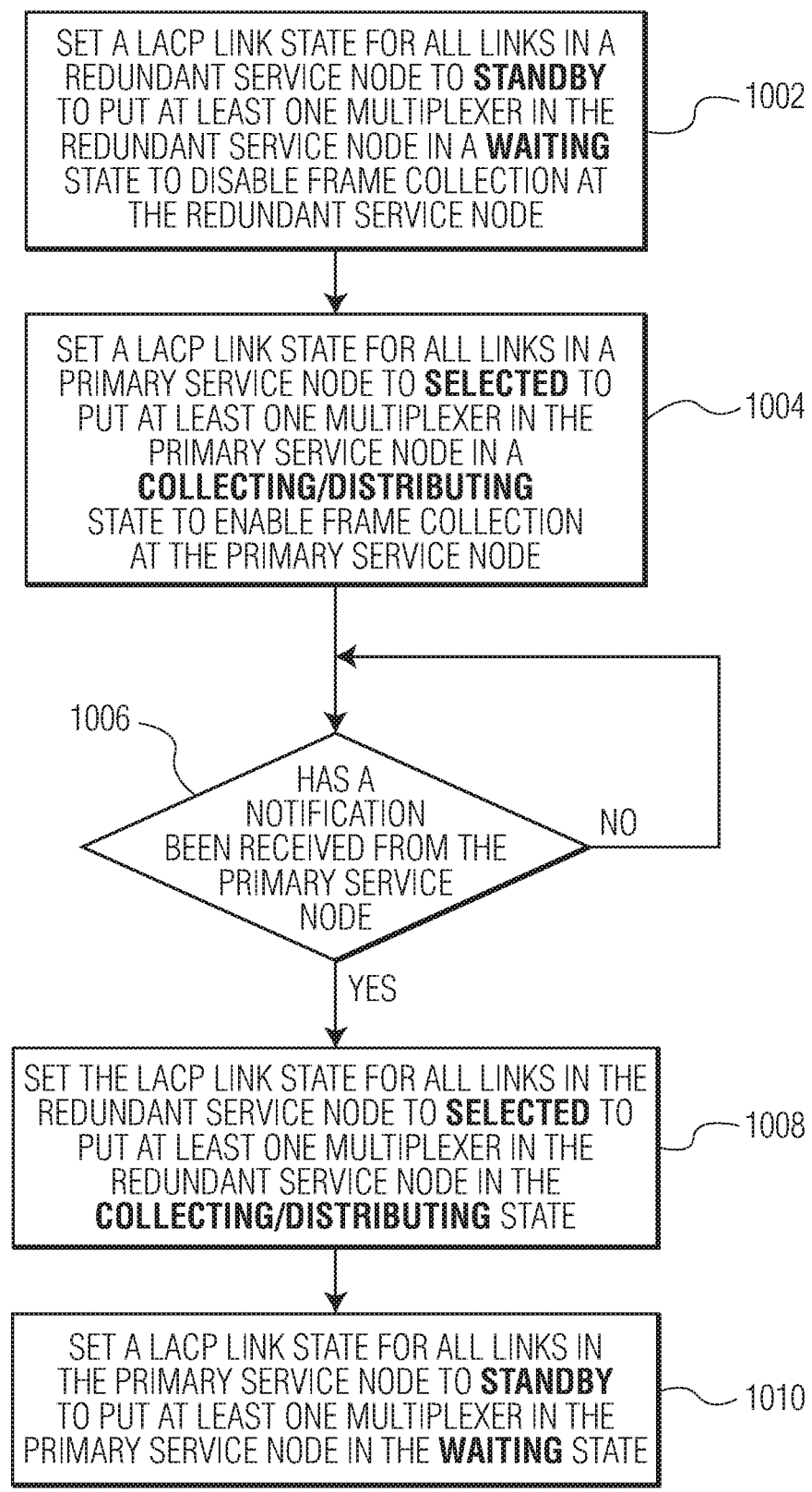
FIG. 10 is a flow chart diagram of a method for configuring a connection using redundant service nodes.

FIG. 10 is a flow chart diagram of a method for configuring a connection using redundant service nodes. At block 1002, a LACP link state for all links in a redundant service node is set to STANDBY to put at least one multiplexer in the redundant service node in a WAITING state to disable frame collection at the redundant service node. When the LACP link state for all links in the redundant service node is set to STANDBY, mux state machines in the redundant service node automatically change state to the WAITING state and the connection to the redundant service node appears to be down or disabled. Traffic does not flow over the redundant service node. In an embodiment, setting the LACP link state for all links in the redundant service node to STANDBY is triggered by putting the redundant service node in the BACKUP mode. As a result of setting the mode, selected variables in aggregation controllers (e.g. aggregation controller 206 in FIG. 2) in the redundant service node are set using LACP commands. At block 1004, a LACP link state for all links in a primary service node is set to SELECTED to put at least one multiplexer in the primary service node in a COLLECTING/DISTRIBUTING state to enable frame collection at the primary service node. By setting the LACP link states for all links in the primary service node, mux state machines in the primary service node automatically change state to the COLLECTING/DISTRIBUTING state and the connection to the primary service node appears to be up or enabled. Traffic can flow through the primary service node. In an embodiment, setting the LACP link state for all links in the primary service node to SELECTED is triggered by putting the primary service node in the ACTIVE mode. As a result of setting the mode, selected variables in aggregation controllers within the primary service node are set using LACP commands. At decision point 1006, the redundant service node determines if a notification has been received from the primary service node. In an embodiment, the notification is an out-of-band message (e.g., a frame sent using a channel over which network traffic does not flow). Until a notification is received, the technique remains at decision point 1006. Once a notification is received, then, at block 1008, the LACP link state for all links in the redundant service node is set to SELECTED to put the at least one multiplexer in the redundant service node in the COLLECTING/DISTRIBUTING state and, at block 1010, the LACP link state for all links in the primary service node is set to STANDBY to put the at least one multiplexer in the primary service node in the WAITING state. Thus, traffic over the redundant service node is enabled, while traffic over the primary service node is disabled. Accordingly, redundancy can be implemented by toggling the mode of service nodes and, thus, the LACP link state of all links in a service node at once using LACP commands to enable and disable traffic flow over the service nodes.

By using LACP commands to set LACP link states for links in service nodes along a pathway, traffic can be directed by re-setting the LACP link states for the links in the service nodes without additional network configuration. For example, by setting and re-setting LACP link states to change the state of multiplexers in service nodes, configuration of the switches is not required. Instead, traffic can be directed along a desired pathway by setting the LACP link states for links along pathways in the redundant network connection.

In an embodiment, the above-described functionality is performed by a computer or computers configured to execute computer readable instructions. In an embodiment, a computer includes a processor, memory, and a communications interface. The processor may include a multifunction processor and/or an application-specific processor. Examples of processors include the PowerPC™ family of processors by IBM and the x86 family of processors by Intel such as the Xeon™ family of processors and the Intel X5650 processor. The memory within the computer may include, for example, storage medium such as read only memory (ROM), flash memory, RAM, and a large capacity permanent storage device such as a hard disk drive. The communications interface enables communications with other computers via, for example, the Internet Protocol (IP). The computer executes computer readable instructions stored in the storage medium to implement various tasks as described above.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a non-transitory computer-readable storage medium for execution by a computer. As an example, an embodiment of a non-transitory computer-readable storage medium includes a computer useable storage medium configured to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method using redundant service nodes to redirect traffic from a second path between a first switch and a second switch to a first path between the first switch and the second switch, the method comprising:
    directing traffic along the second path by setting a link aggregation control protocol (LACP) link state of a first plurality of ports to STANDBY and the LACP link state of a second plurality of ports to SELECTED,
        wherein a first service node comprises the first plurality of ports,
        wherein a second service node comprises the second plurality of ports,
        wherein the first path comprises a first link aggregation group (LAG), a second LAG, and the first service node,
        wherein the first lag is a full duplex link,
        wherein the second LAG is a half-duplex link,
        wherein the second path comprises a third LAG, a fourth LAG, and the second service node,
        wherein the first LAG connects the first switch to the first service node,
        wherein the second LAG connects the first service node to the second switch,
        wherein the third LAG connects the first switch to the second service node,
        wherein the fourth LAG connects the second service node to the second switch,
        wherein setting the LACP link state the first plurality of ports to STANDBY disables frame collection by the first service node on the first LAG and on the second LAG, and
        wherein setting the LACP link state of the second plurality of ports to SELECTED enables frame collection by the second service node on the third LAG and on the fourth LAG; and
    after directing traffic along the second path, redirecting traffic along the first path by setting the LACP link state of the first plurality of ports from STANDBY to SELECTED and the LACP link state of the second plurality of ports from SELECTED to STANDBY,
        wherein setting the LACP link state of the first plurality of ports to SELECTED enables frame collection by the first service node on the first LAG and on the second LAG, and
        wherein setting the second plurality of ports to STANDBY disables frame collection by second service node on the third LAG and on the fourth LAG.

2. The method of claim 1,
    wherein the first service node is configured to, upon being set to BACKUP mode, set the LACP link state of the first plurality of ports to STANDBY,
    wherein the first service node is configured to, upon being set to ACTIVE mode, set the LACP link state of the first plurality of ports to SELECTED,
    wherein the second service node is configured to, upon being set to BACKUP mode, set the LACP link state of the second plurality of ports to STANDBY,
    wherein the second service node is configured to, upon being set to ACTIVE mode, set the LACP link state of the second plurality of ports to SELECTED, and
    wherein the first service node is set to ACTIVE and the second service node is set to BACKUP upon the sending of a notification from the second service node to the first service node.

3. The method of claim 1, wherein redirected traffic occurs upon the sending of a notification from the second service node to the first service node, and wherein the notification is sent out-of-band.

4. The method of claim 1, wherein redirected traffic occurs upon the sending of a notification from the second service node to the first service node, and wherein the notification is sent in response to at least one of the second service node becoming unavailable, tracking interfaces becoming unavailable, and a manual user interaction.

5. The method of claim 1 wherein redirecting traffic after directing traffic occurs without configuring the first switch or the second switch.

6. The method of claim 1, wherein the LACP link state for each port is set by setting a selected variable for each port, and wherein the selected variable for a port is set using a link aggregation control protocol with protocol data units transmitted on one second intervals.

7. The method of claim 1, wherein the LACP link state for each port is set by setting a selected variable for each port, and wherein the selected variable for all ports of a LAG in a service node is set to the same value concurrently.

8. A method using redundant service nodes to redirect traffic from a second path between a first switch and a second switch to a first path between the first switch and the second switch, the method comprising:
  directing traffic along the second path by setting a link aggregation control protocol (LACP) link state for a plurality of ports of a in a first service node to STANDBY and by setting the LACP link state for a plurality of ports of a second service node to SELECTED,
  wherein setting the LACP link state for the ports in the first service node to STANDBY puts at least one multiplexer in the first service node in a WAITING state to disable frame collection/distribution at the first service node via the first LAG and the third LAG, wherein the first service node is located between a first switch and a second switch, the first LAG connected between the first switch and the first service node and the third LAG connected between the second switch and the first service node,
  wherein setting the LACP link state for the ports in the second service node to SELECTED puts at least one multiplexer in the second service node in a COLLECTING/DISTRIBUTING state to enable frame collection/distribution at the second service node via the second LAG and the fourth LAG, wherein the second service node is located between the first switch and the second switch, the second LAG connected between the first switch and the second service node and the fourth LAG connected between the second switch and the second service node, and
  wherein the first service node and the second service node are connected by an in-band connection; and
  after directing traffic along the second path and upon receipt of a notification from the second service node, redirecting traffic along the first path by:
    setting the LACP link state for the ports in the first service node to SELECTED to put the at least one multiplexer in the first service node in the COLLECTING/DISTRIBUTING state; and
    setting the LACP link state for the ports in the second service node to STANDBY to put the at least one multiplexer in the second service node in the WAITING state.

9. The method of claim 8, wherein setting the LACP link state for the ports a service node to STANDBY is triggered by putting the service node in a BACKUP mode and setting the LACP link state the ports in a service node to SELECTED is triggered by putting the service node in an ACTIVE mode.

10. The method of claim 8, wherein the LACP link state for each port is set by setting a selected variable for each port, and wherein the selected variable for a port is set using a link aggregation control protocol with protocol data units transmitted on one second intervals.

11. The method of claim 8, wherein the LACP link state for each port is set by setting a selected variable for each port, and wherein the selected variable for all ports in a service node is set concurrently.

12. The method of claim 8, wherein redirected traffic occurs upon the sending of the notification from the second service node to the first service node, and wherein the notification is sent out-of-band.

13. The method of claim 8, wherein redirected traffic occurs upon the sending of the notification from the second service node to the first service node, and wherein the notification is sent in response to at least one of the second service node becoming unavailable, tracking interfaces becoming unavailable, and a manual user interaction.

14. The method of claim 8 wherein redirecting traffic after directing traffic occurs without configuring the first switch or the second switch.

15. A method using redundant service nodes to redirect traffic from a second path between a first switch and a second switch to a first path between the first switch and the second switch, the method comprising:
  directing traffic along the second path by setting a link aggregation control protocol (LACP) link state for a plurality of ports of a in a first service node to STANDBY and by setting the LACP link state for a plurality of ports of a second service node to SELECTED,
  wherein setting the LACP link state for the ports in the first service node to STANDBY puts at least one multiplexer in the first service node in a WAITING state to disable frame collection/distribution at the first service node via the first LAG and the third LAG, wherein the first service node is located between a first switch and a second switch, the first LAG connected between the first switch and the first service node and the third LAG connected between the second switch and the first service node,
  wherein setting the LACP link state for the ports in the second service node to SELECTED puts at least one multiplexer in the second service node in a COLLECTING/DISTRIBUTING state to enable frame collection/distribution at the second service node via the second LAG and the fourth LAG, wherein the second service node is located between the first switch and the second switch, the second LAG connected between the first switch and the second service node and the fourth LAG connected between the second switch and the second service node,
  wherein the LACP link state for each port is set by setting a selected variable for each port, and wherein the selected variable for a port is set using a link aggregation control protocol with protocol data units transmitted on one second intervals, and
  wherein the first service node and the second service node are not connected by an in-band connection; and
  after directing traffic along the second path and upon receipt of a notification from the second service node, redirecting traffic along the first path by:
    setting the LACP link state for the ports in the first service node to SELECTED to put the at least one multiplexer in the first service node in the COLLECTING/DISTRIBUTING state; and
    setting the LACP link state for the ports in the second service node to STANDBY to put the at least one multiplexer in the second service node in the WAITING state.

* * * * *